United States Patent [19]

Risser et al.

[11] Patent Number: 4,691,410
[45] Date of Patent: Sep. 8, 1987

[54] GIZZARD HARVESTER

[75] Inventors: Dale M. Risser, Salisbury, Md.;
Michael E. Lease, Delmar, Del.

[73] Assignee: Perdue Incorporated, Salisbury, Md.

[21] Appl. No.: 839,950

[22] Filed: Mar. 17, 1986

[51] Int. Cl.4 ............................................. A22C 21/00
[52] U.S. Cl. ...................................................... 17/11
[58] Field of Search ................................ 17/11, 50, 51

[56] References Cited

U.S. PATENT DOCUMENTS

| 3,175,244 | 3/1965 | Sharp et al. | 17/45 |
| 3,590,421 | 7/1971 | Loth | 17/11 R |
| 4,528,720 | 7/1985 | Young et al. | 17/51 X |

Primary Examiner—Willie G. Abercrombie
Attorney, Agent, or Firm—Hoffman, Wasson & Fallow

[57] ABSTRACT

A gizzard harvester is disclosed having a support receiving a gizzard and holding the same against rotation as the gizzard is lowered onto a rotating cone spindle which both washes foreign matter from the gizzard and removes its lining by rotating the lining with respect to the gizzard. A mechanism for advancing the gizzard onto the spindle includes a laterally split device whose halves are biased together by spring tension so that the gizzard remains restrained as it is forced downward over the cone. Washing parts are provided at the tip of the cone, which ports also assist removal of the liner from the spindle.

12 Claims, 8 Drawing Figures

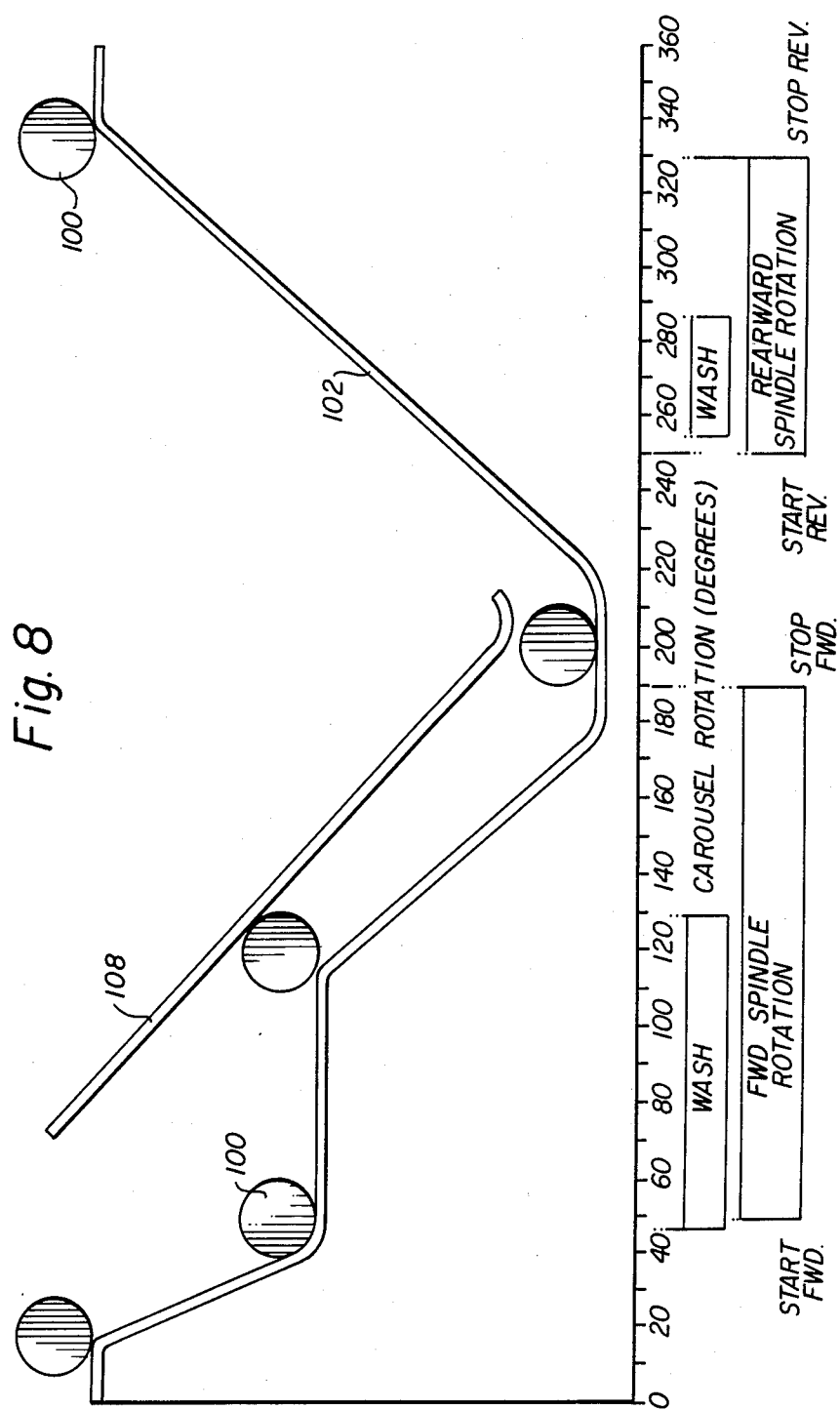

4,691,410

GIZZARD HARVESTER

This invention relates generally to the art of butchering, and particularly to the art of gizzard processing.

BACKGROUND OF THE INVENTION

There are, both disclosed within the patent art, and available in commerce today, numerous devices for processing poultry gizzards. This aspect of poultry processing, which formerly was a tedious hand procedure, has become increasingly mechanized.

The volume of birds handled by a modern plant, typically hundreds of thousands per day, has magnified the need for efficient machinery. Not only is speed important, it is also necessary to avoid mutilating the gizzards as they are cleaned. Unfortunately, present-day gizzard processors do damage a substantial proportion, often over half, of the gizzards passed through them to the point of commercial unacceptability. In fact, it is sometimes necessary for a producer to purchase gizzards to make up giblet packs for whole birds. A reduced rejection rate would thus be highly desirable.

To process or "harvest" a gizzard, one must by some means: (a) separate the gizzard from the stomach and entrails attached to it, (b) remove stones, sand and other foreign material from the interior of the gizzard, and (c) remove the tough, inedible interior lining. Adequate automated machines exist for performing step (a). These may comprise a pair of counter-rotating parallel rolls separated by a space substantially smaller in width than a gizzard, with helical grooves to advance the gizzards to a portion having teeth that engage the entrails and tear them from the gizzards. Steps (b) and (c) are usually preceded by slitting the gizzard lengthwise in a radial plane, whereupon the gizzard can be spread open for cleaning. The lining, thus exposed, is removed by peeling it from the edible remainder of the organ. Most of the automatic prior art gizzard harvesters have a knife or the like to slit the gizzards as a processing step. This may precede or follow grit removal; in the former case, knife wear is a problem.

An unusual approach is disclosed in U.S. Pat. No. 3,175,244. In that patent, a gizzard is first cleaned by inserting a flushing jet into the gizzard cavity. The gizzard is then telescoped over the free end of a rotating arbor, which in one embodiment has a conical portion with helical, square grooves thereon, that tears the lining from the gizzard without the usual cutting step. This device did not, however, become commercially successful. So, despite the many approaches tried thus far, no device has emerged that is both uncomplicated and capable of harvesting gizzards at high speed with a low rejection rate.

It is therefore an object of this invention to process gizzards in such a way as to minimize their rejection rate. In other words, the object is to remove fully the liner and all grit from each gizzard, without tearing it in half or otherwise making it unmarketable as a giblet.

Indeed, another object is to remove the liner and grit from a gizzard without the customary slitting.

A further object is to perform the steps of cleaning and lining removal at a single station, at essentially the same time.

Another object is to provide the industry with a machine capable of mass-production processing rates while attaining the above objects.

SUMMARY OF THE INVENTION

The invention satisfies these and other objects by providing a device for removing foreign material and the lining from a gizzard. The device includes means for holding the gizzard against rotation, a conical spindle head having an apex facing the holding means and having a surface adapted to wrap the lining around the head, means for advancing the holding means toward the spindle, means for rotating the spindle head within the gizzard, and means for washing foreign material from the gizzard.

While a single device having the structure set out in the prior paragraph satisfies the stated objects of the invention, we prefer to combine a plurality of such devices in a carousel arrangement, inasmuch as much higher production rates can thereby be attained. In the preferred embodiment described below, a carousel comprising six gizzard harvesting devices is disclosed which has mechanical means for controlling operation of the holding means, the advancing means, the rotating means, and the washing means. This apparatus is capable of production rates of about one gizzard per second, with a much lower rejection rate than has heretofore been obtainable.

Other features and advantages of the invention will be apparent from the following description, read with reference to the drawings.

BRIEF DESCRIPTION OF THE DRAWINGS

FIG. 8 shows in diagrammatic form the holder carriage elevation, the wash cycles, and the spindle rotation, all as a function of angular displacement of the carousel.

DESCRIPTION OF THE PREFERRED EMBODIMENT

Figure 1:
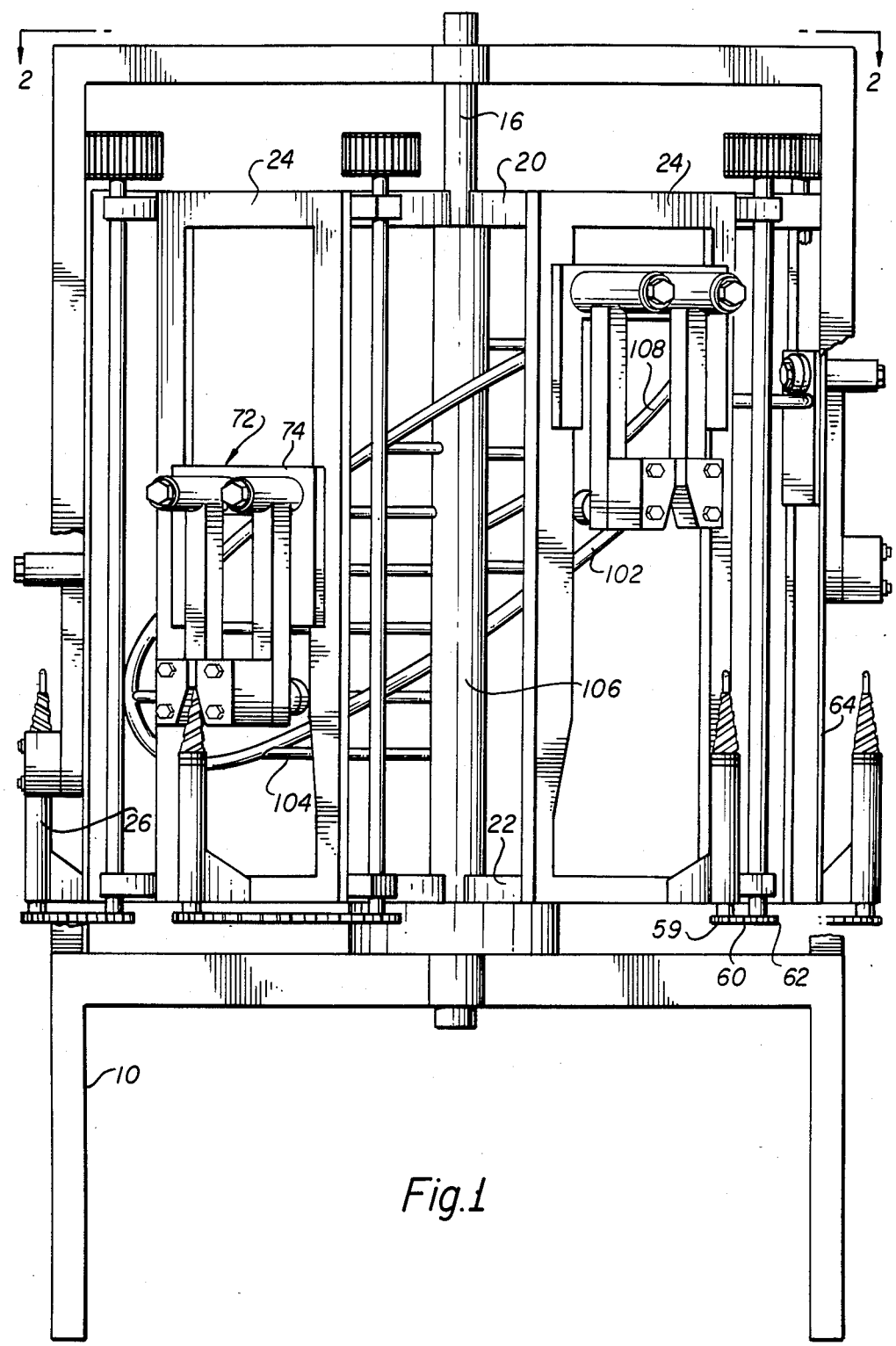
FIG. 1 is a front elevation of a preferred embodiment of the invention.
Figure 2:
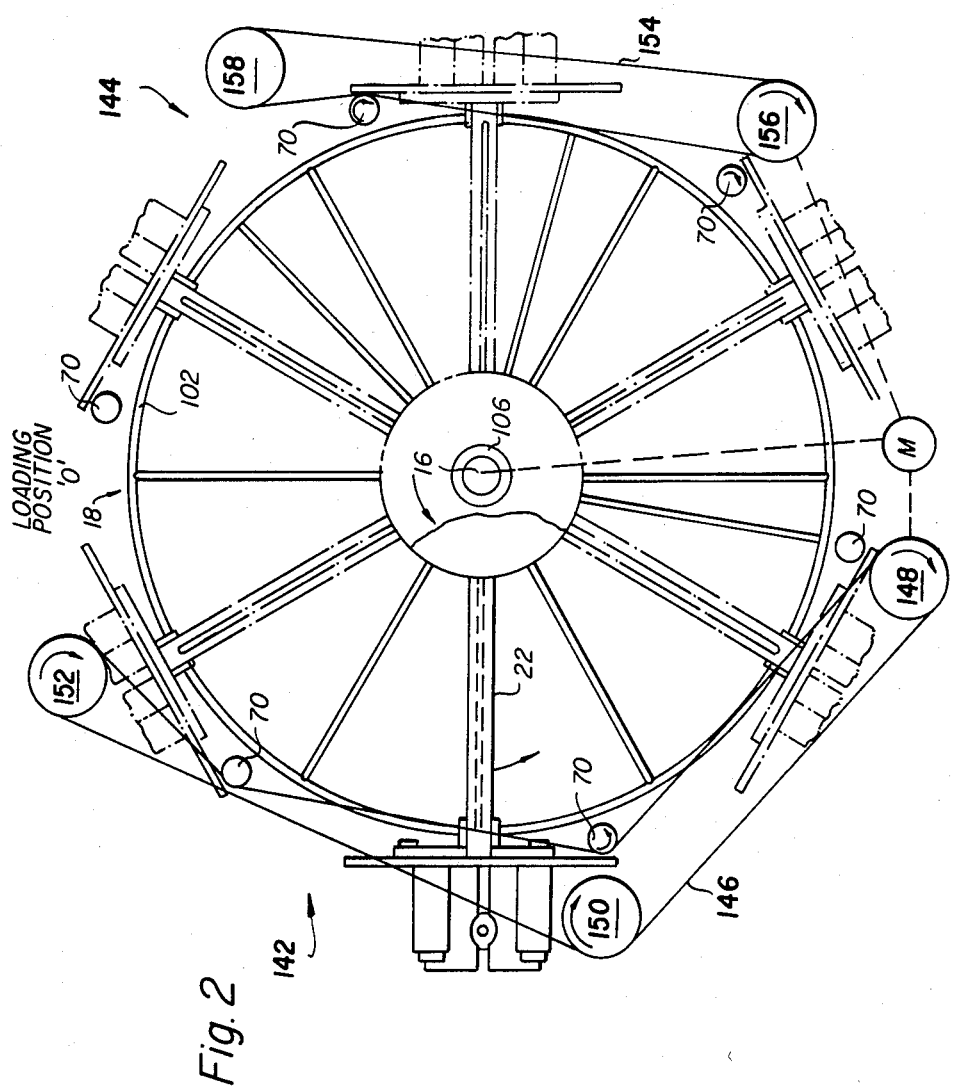
FIG. 2 is a simplified view taken along the line 2—2 in FIG. 1.

With reference to FIGS. 1 and 2, a gizzard harvester embodying the invention comprises a stationary base 10 having upper and lower bearings through which an axle 16 extends along a vertical axis. The axle 16 supports a carousel, designated generally 18, which includes upper and lower spiders 20 and 22 respectively, each having six spokes. The carousel further comprises six rectangular frames 24, each of which is bolted at its upper and lower end to respective flanges welded to the ends of respective spokes. Thus, the spiders, with the six frames attached thereto, form a rigid assembly that can rotate about its vertical axis.

Figure 3:
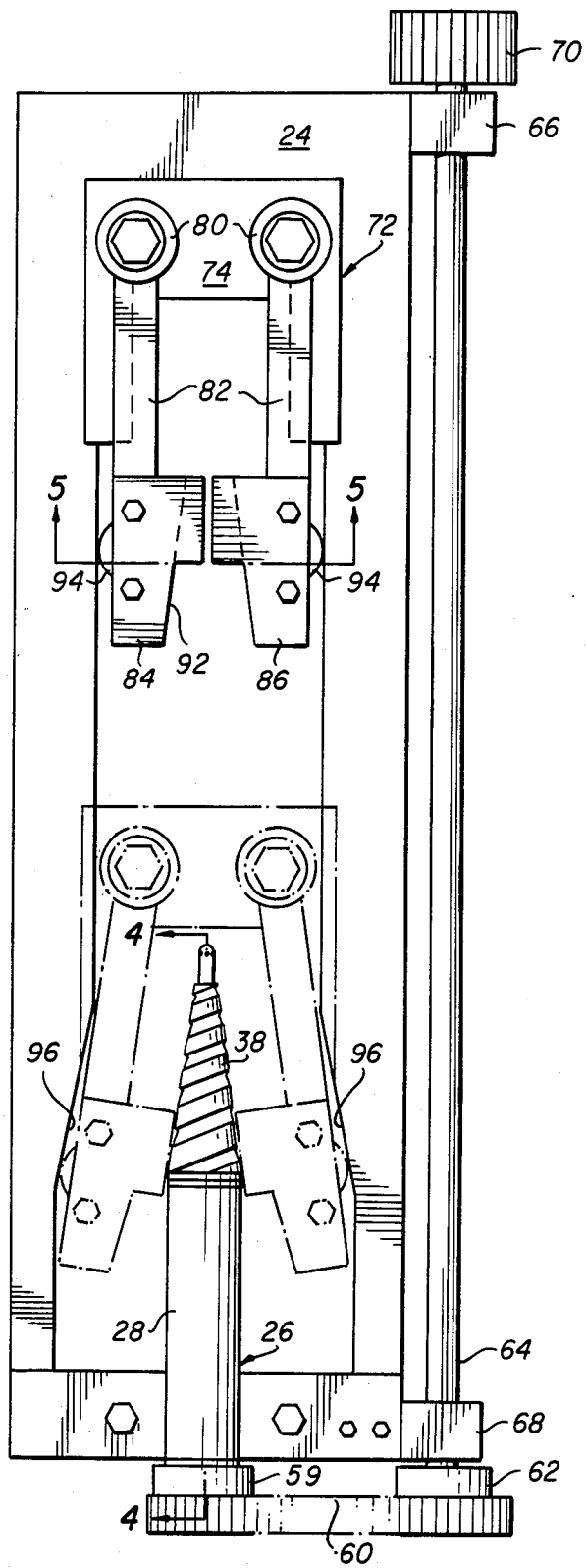
FIG. 3 shows a portion of FIG. 2 in greater detail.
Figure 4:
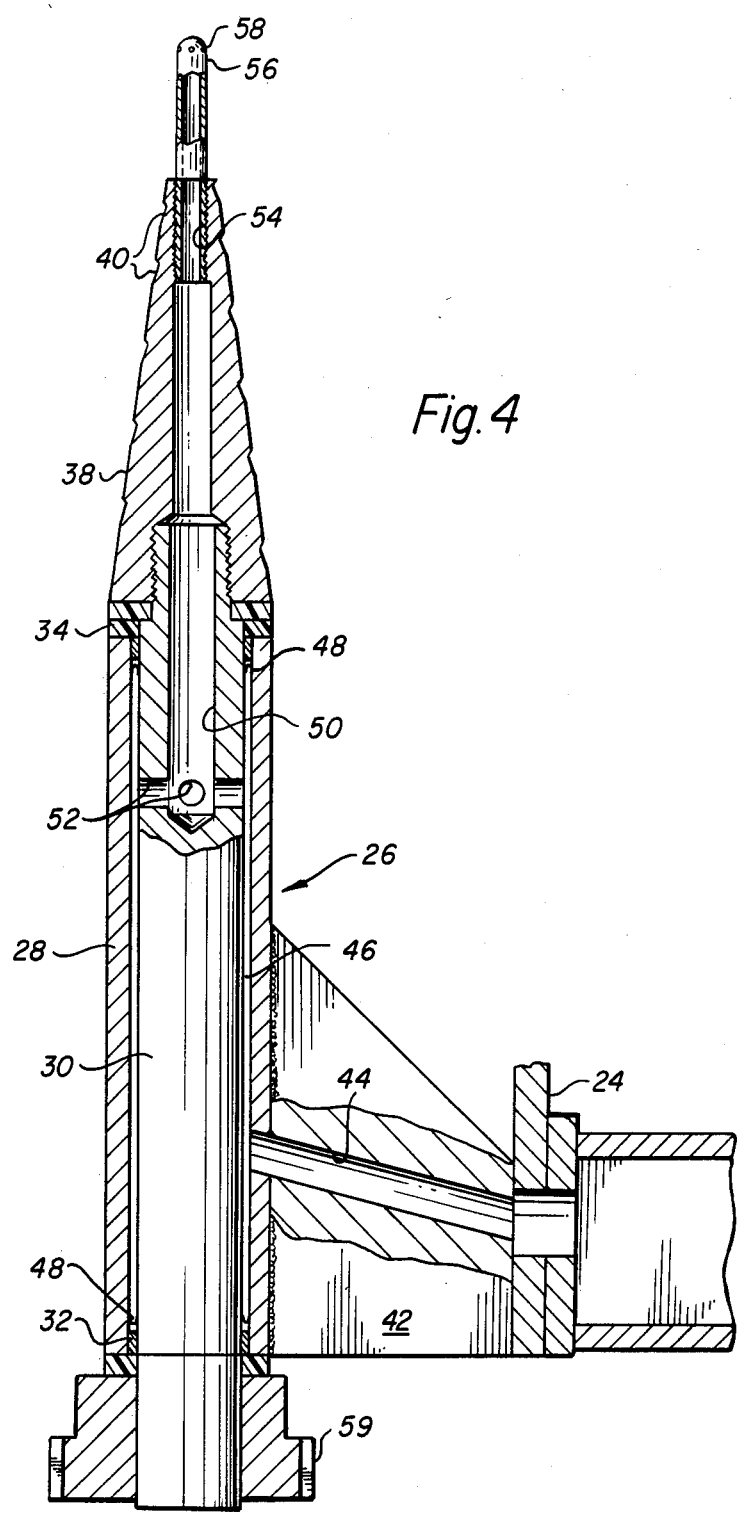
FIG. 4 is a sectional view taken along the line 4—4 in FIG. 3 showing the spindle mechanism in detail.

Each frame supports a single gizzard harvesting device, shown in detail in FIGS. 3-6. As shown in FIG. 4, the frame 24 has welded thereto a spindle assembly 26, which includes a stationary housing 28 and a hollow shaft 30 journalled therein by bearings 32, 34. The shaft has at its upper end a conical head 38, optimally having an apex angle of fifteen degrees. The surface of the spindle head must be adapted to engage the gizzard liner as the head rotates, and thus wrap the liner tightly around the head; for this purpose, right hand spiral grooves 40 are cut in the exterior surface of the head. The spindle assembly is supported by a gusset 42 having an internal throughbore 44 communicating between the interior of the spider spoke (to which it is attached) and the annular space 46 between the shaft 30 and the housing 28. Upper and lower cup-type seals 48 prevent water leakage along the shaft. The upper end of the shaft itself has a blind axial bore 50 with lateral ports 52 extending therefrom, to allow water to enter the bore from the annular space 46. The conical head 38 has an upper central threaded hole 54 at its apex, into which a hollow washing tip 56 is screwed. Lateral orifices 58 in the tip direct washing water from the cone bore outward.

Once again referring to FIG. 3, for rotating the spindle, a sprocket 59 is affixed to the bottom end of the shaft 30. A chain 60 connects the sprocket 59 to a countersprocket 62 attached to the lower end of a countershaft 64, supported near its ends by upper and lower bearings 66, 68, and a pulley 70 for a toothed drive belt is attached to the upper end of the shaft.

Figure 5:
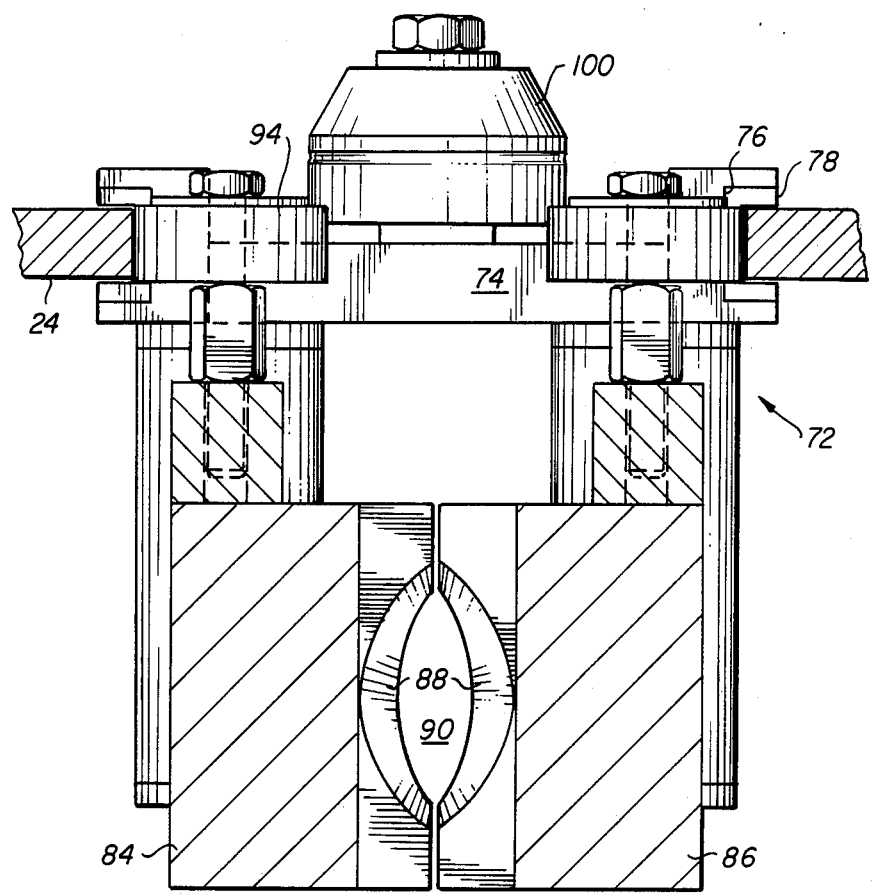
FIG. 5 is a bottom view of the gizzard-holding jaws, taken along the line 5—5 in FIG. 3.

In FIGS. 1, 3 and 5, the numeral 72 designates a carriage vertically moveable within the frame 24. The carriage comprises a plate 74 having, at either end thereof, a vertical groove 76 (FIG. 5) in which a plastic insert 78 is retained, to act as a sliding bearing engaging the vertical sides of the frame.

The carriage plate 74 supports a pair of knuckles 80 (FIG. 3) that protrude horizontally outward from the plate, each knuckle having a downwardly projecting arm 82 thereon. The arms have symmetrical, opposed respective jaws 84, 86 attached to the lower ends thereof, and these jaws function as means for holding a gizzard against rotation, as described below.

Each jaw is formed from a generally rectangular block of plastic with a portion removed from the face thereof to define an indentation 88 in the shape of a segment of a cone, whereby when the jaws are closed together, the indentations form a tapering channel 90 whose horizontal cross-section (FIG. 5) is at all points almond shaped, but tapers upwardly at the same angle as the spindle head so as to conform thereto. The lower portion of each face is cut away at rabbet 92. Owing to the pivotal mounting of the arms provided by the knuckles 80, the jaws can move toward or away from one another; however, the outward movement of each jaw is limited by the interaction of a roller follower 94 with the inner edge of the frame 24. And as FIG. 3 shows, the frame opening has greater width at the bottom than at the top, owing to camming ramps 96 adjacent and parallel to the sides of the spindle head 38. Consequently, the jaw separation is a function of the vertical position carriage, and the jaws automatically separate as they descend over the spindle, closely following the spindle taper. To control carriage height as the carousel rotates, a roller 100 attached to the rear of the carriage plate 74 rides upon a primary cam 102 that remains stationary, the cam being supported by rods 104 radially extending from a collar 106 that is fixed with respect to the base 10.

Ordinarily, the weight of the carriage is sufficient to maintain the roller 100 in contact with the primary cam 102. However, since particularly difficult gizzards can overcome the gravity bias, a secondary cam 108 is also attached to the collar above a descending portion of the primary cam, to force the carriage down if necessary.

A graph of the cam contours appears at FIG. 8. The abscissa of the graph is the angular rotation of a given station from its loading position, which is arbitrarily designated zero degrees. The ordinate is the elevation of the carriage at any angular displacement from zero.

Figure 6:
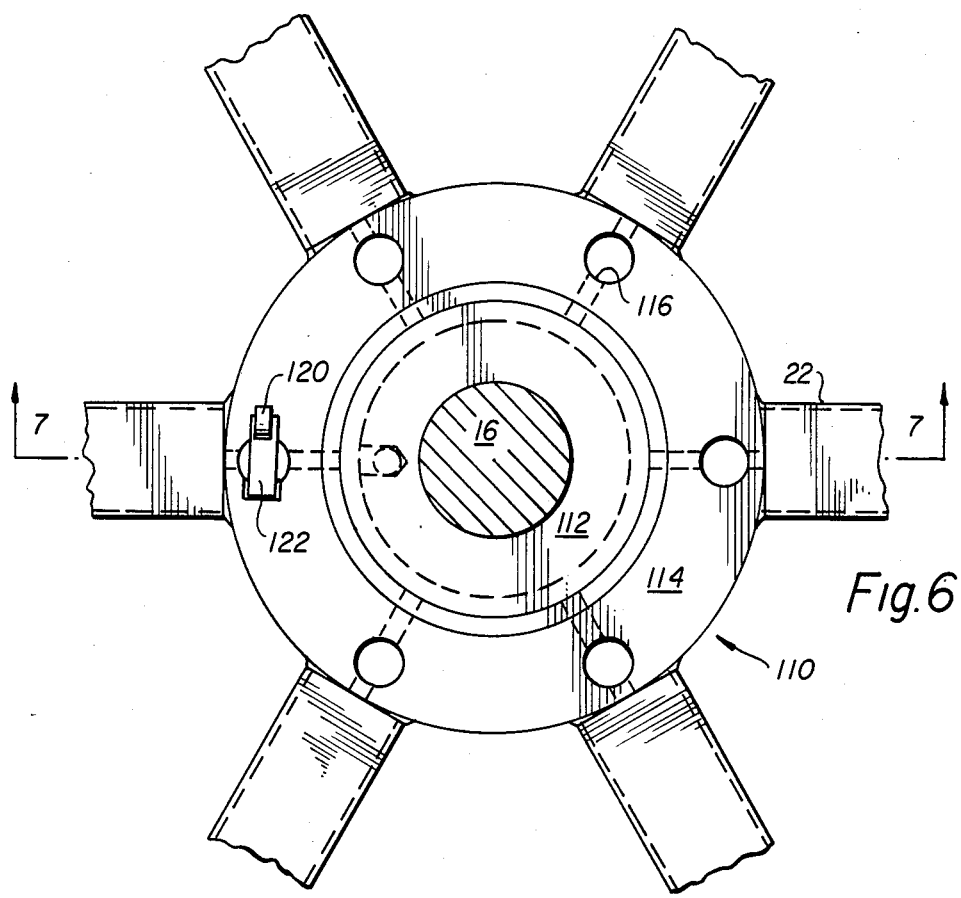
FIG. 6 shows a water distributor in a plan view taken along the line 6—6 in FIG. 1.
Figure 7:
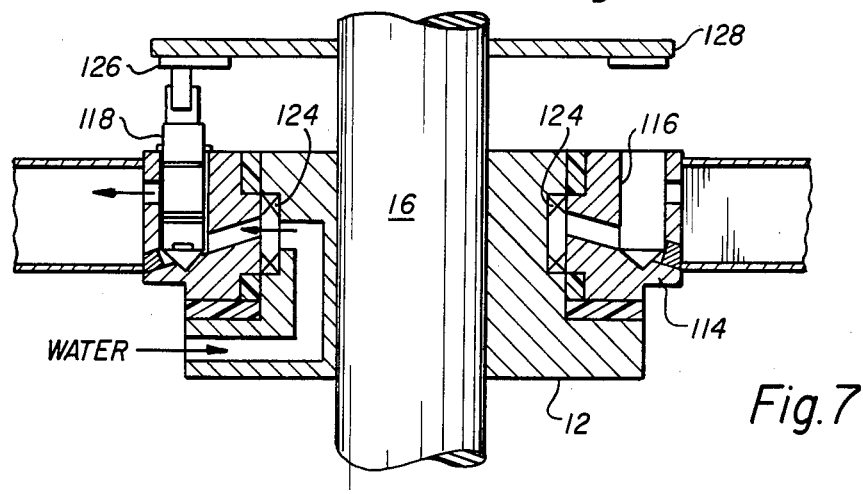
FIG. 7 is a sectional view taken along the line 7—7 in FIG. 6.

Water is directed to each spindle during predetermined portions of the cycle by a water distributor 110, shown in FIGS. 1, 6 and 7, which incidentally acts as a thrust bearing supporting the weight of the carousel. The distributor comprises a lower stationary body 112 and a rotor 114 having six outlet holes 116 respectively in communication with the six spindle assemblies 26 via the hollow spokes in lower spider 22. Each hole 116 houses a normally closed mechanically actuated valve 118 having a roller follower 120 mounted on the free end of a pivotally mounted actuator arm 122. A valve suitable for this purpose is available from Clippard Instrument Laboratory, Inc. of Cincinatti, Ohio under part number MJV-2C; a cam follower from Clippard, part number 11925, is preferred for use with this valve.

As FIG. 7 shows, the stator 112 has an internal water passage that is connected to a water supply. The rotor 114, which is supported by a thrust washer and upper and lower bushings, is provided with a pair of U-cup seals 124 defining an annular space through which water flows en route to the valves.

The valves 118 are actuated (depressed) by lobes 126 on a disc-shaped cam 128 that is attached to the axle so as to remain stationary even as the carousel rotates, thus causing the valves to be opened periodically. The dwell of valve opening is shown at the bottom of the diagram in FIG. 8.

As shown diagrammatically in FIG. 2, each countershaft 64, and thereby its respective spindle head 38, is driven during only portions of each carousel revolution by two belt drives 142, 144 which come in contact with the pulleys 10 at predetermined points and remain in contact therewith for dwell angles illustrated at the bottom of FIG. 8.

As shown diagramatically in FIG. 2, the forward drive 142, attached to the base 10 at the top of the apparatus, comprises an internally and externally toothed endless belt 146 entrained on a drive pulley 148 and idler pulleys 150, 152. Drive means such as a motor connected to the driven pulley is indicated by the letter M. The reverse drive 144 comprises a similar but shorter belt 154 running on a driven pulley 156 and an idler pulley 158. Pulley 156 is preferably driven by the same means M, above.

The carousel itself is turned, preferably synchronously with the spindles, by drive means M which may or may not be identical to the means described above.

In operation, means M is continuously operated, rotating the belts 146, 154 and the carousel 18 at a constant speed in the directions indicated by arrows in FIG. 2. The pulleys 10 engage the belts (which drive in opposite directions) during selected portions of each operating cycle, i.e., one revolution of the carousel. Furthermore, during each cycle, the carriage elevation varies, and so does the jaw spacing, while the water distributor supplies pressure to the jet orifices at certain times. All of these events are synchronously related by the mechanical controls described above. The following text follows one station from the gizzard loading point, zero or "0", in its movement through the cycle. Reference may be made to FIG. 8 for the relationship of various events in the cycle.

Starting with the station at zero degrees, the carriage is fully raised, the spindle idle, and the water "off". At this point, while the carousel is rotating, a synchronous pick-and-place mechanism (not shown) places a gizzard that it has removed from the entrail cutter over a spindle head 38 so that the tip 56 protrudes into the organ and within the lining to be removed. Presently, the contour of cam 102 allows the carriage 72 to descend until the jaws 84,86 cover the gizzard. The contour of the upper portion of the frame 24, acting against the followers 94, maintains the jaws in close proximity, so that the gizzard is held snugly within the almond-shaped channel defined by the jaw faces. When the station approaches forty-five degrees angular displacement, the water valve 118 in the water distributor is actuated as a cam lobe 126 depresses the respective follower 120, thus allowing water under line pressure to flow outwardly through the spoke and the gusset throughbore 44 to the annular space 46 between the spindle housing 28 and its shaft 30. Thence, water enters the shaft bore via ports 52, and escapes therefrom via the tip orifices 58. Any sand, gravel, or other foreign matter within the gizzard is quickly washed away by the jets of water so created. The water distributor saves water by halting irrigation after a sufficient dwell period.

During the washing cycle, the pulley 70 comes into engagement with the forward drive belt 142. This results in forward rotation of the spindle head, tending—owing to the hand of the threads—to screw the spindle head into the gizzard, since the latter is still prevented from rotating by the jaws 84, 86. The washing cycle continues as the spindle head 38 and its tip 56 rotate within the gizzard; this in no small way ensures a thorough flushing out of loose material inside the gizzard.

Next, the profile of the cam 102, once again descending, allows the carriage to fall, forcing the gizzard over progressively larger portions of the spindle head. During this phase, the liner, being less expandable than the rest of the organ, becomes so tightly wrapped on the head that it is torn away, or peeled, from the organ's muscle. The liner remains wrapped around the upper portion of the spindle head while the muscle portion is pushed lower. Eventually, the increasing head diameter ruptures the gizzard muscle, so that this edible portion falls into a receiver, not shown. The cam 102 now raises the carriage, and water is applied through the jets while the spindle head is rotated in the reverse direction by the reverse drive belt 154. The combination of reverse rotation and water spray has been found to remove liners from the spindle reliably. As one revolution is completed, the spindle is thus ready to receive another gizzard from the pick-and-place device. The continuous operation of this device allows one to achieve very high production rates, with constant inputs of raw material, power and water. Our reliance upon simple mechanical elements to control the operating cycle avoids the need for expensive, less reliable electrical or electronic controls. This invention thereby provides the industry with useful mass-production gizzard harvester not requiring slitting or peeling knives. It also enables one to produce whole gizzards free of grit and residual liner material, with previously unheard of low rejection rates.

The foregoing description and the drawings to which it refers should be regarded as only illustrative of the invention defined by the following claims, since the invention is subject to variations, some of which will readily occur to one of skill in the art. For example, the spindle head could be held stationary while the gizzard was rotated upon it, plainly with the same results. Also, rather than moving the gizzard holding mechanism toward the spindle head, the spindle could be moved toward the gizzard holder. In either case, it is only the relative movement that is important, as set out in the first claim below.

We claim:

1. A device for removing foreign material and lining from a gizzard, comprising
    means for holding the gizzard against rotation,
    a spindle head having a tip facing the holding means,
    means for producing relative rotation between the spindle head and the gizzard holding means,
    means for producing relative linear movement between the spindle head and the gizzard holding means so that said gizzard is forced to engage progressively larger diameters of said spindle head,
    said spindle head having a surface adapted to engage the gizzard lining as said relative rotation occurs, thereby to separate the lining from the gizzard, and
    means for washing foreign material from said gizzard.

2. The invention of claim 1, wherein the means for producing relative linear movement comprises means for advancing the holding means toward the spindle head, the latter being linearly immobile; wherein said spindle head is rotatably mounted on a frame; and wherein said advancing means comprises
    a carriage mounted for movement along said frame toward and away from said spindle head,
    a roller follower attached to said carriage, and
    a primary cam affixed to said frame and engaged by said roller for controlling the position of the carriage.

3. The invention of claim 1, wherein said holding means comprises jaw structure defining a channel adapted to hold a gizzard against rotation as its lining is removed.

4. A device for removing foreign material and lining from a gizzard, comprising
    means for holding the gizzard against rotation,
    a spindle head having a tip facing the holding means,
    means for rotating the spindle head relative to the gizzard holding means,
    means for producing relative linear movement between the spindle head and the gizzard holding means so that said gizzard is forced to engage progressively larger diameters of said spindle head,
    said spindle head having a surface adapted to engage the gizzard lining as said relative rotation occurs, thereby to separate the lining from the gizzard, and
    means for washing foreign material from said gizzard, and
    wherein said spindle head is rotatably mounted on a frame, said advancing means comprises a carriage mounted for movement along said frame toward and away from said spindle head, and said holding means further comprises
    a pair of arms pivotally attached to said carriage, said jaws being attached to said respective arms, and
    a cam follower attached to each arm,
    said frame having thereon camming ramps engaged by said followers, for limiting the separation distance between said jaws as a function of the position of said carriage with respect to said frame.

5. A device for removing foreign material and lining from a gizzard, comprising
   means for holding the gizzard against rotation,
   a spindle head having a tip facing the holding means,
   means for producing relative rotation between the spindle head and the gizzard holding means,
   means for producing relative linear movement between the spindle head and the gizzard holding means so that said gizzard is forced to engage progressively larger diameters of said spindle head,
   said spindle head having a surface adapted to engage the gizzard lining as said relative rotation occurs, thereby to separate the lining from the gizzard, and
   means for washing foreign material from said gizzard,
   wherein said holding means comprises jaw structure defining a channel adapted to hold a gizzard against rotation as its lining is removed, and
   wherein said jaw structure comprises a pair of relatively movable jaws having surface indentations, said indentations defining said channel.

6. A device for removing foreign material and lining from a gizzard, comprising
   means for holding the gizzard against rotation,
   a spindle head having a tip facing the holding means,
   means for producing relative rotation between the spindle head and the gizzard holding means,
   means for producing relative linear movement between the spindle head and the gizzard holding means so that the gizzard is forced to engage progressively larger diameters of said spindle head,
   said spindle head having a surface adapted to engage the gizzard lining as said relative rotation occurs, thereby to separate the lining from the gizzard, and
   means for washing foreign material from said gizzard,
   wherein said holding means comprises jaw structure defining a channel adapted to hold a gizzard against rotation as its lining is removed, and
   wherein said channel has a noncircular cross-section and tapers lengthwise in conformance with said spindle head.

7. The invention of claim 6, wherein said channel has a substantially almond-shaped cross-section.

8. The invention of claim 7, wherein each of said jaws has a transverse rabbet at the lower end of its face.

9. A gizzard harvesting apparatus comprising a base and a carousel supported for rotation upon said base, said carousel comprising a plurality of gizzard harvesting devices, each such device comprising
   a frame,
   a spindle assembly attached thereto, said spingle assembly including a rotatable conical head having a surface adapted rotatably to engage the lining as the head rotates,
   means for rotating said spindle head,
   means for holding a gizzard against rotation, and
   means for advancing the holding means toward the spindle head so that its apex enters the gizzard.

10. A gizzard harvesting apparatus comprising a base and a carousel supported for rotation upon said base, said carousel comprising a plurality of gizzard harvesting devices, each such device comprising
    a frame,
    a spindle assembly attached thereto, said spindle assembly including a rotatable conical head having a surface adapted rotatably to engage the lining as the head rotates,
    means for rotating said spindle head,
    means for holding a gizzard against rotation, and
    means for advancing the holding means toward the spindle head so that its apex enters the gizzard,
    wherein said holding means comprises a pair of relatively movable jaws having surface indentations that define between them a channel adapted to hold a gizzard against rotation as its lining is removed by said rotating spindle head.

11. A gizzard harvesting apparatus comprising a base and a carousel supported for rotation upon said base, said carousel comprising a plurality of gizzard harvesting devices, each such device comprising
    a frame,
    a spindle assembly attached thereto, said spindle assembly including a rotatable conical head having a surface adapted rotatably to engage the lining as the head rotates,
    means for rotating said spindle head,
    means for holding a gizzard against rotation, and
    means for advancing the holding means toward the spindle head so that its apex enters the gizzard, and
    wherein said spindle assembly comprises
    a housing,
    a shaft journalled in said housing,
    said head being attached to one end of said shaft, and
    a sprocket attached to said shaft; and
    said rotating means comprises a forward drive for turning said sprocket in one direction during a portion of said cycle, and a reverse drive for turning said sprocket in the opposite direction during another portion of the cycle.

12. The invention of claim 11, wherein each of said sprockets is connected to a positive drive pulley, and said forward and reverse drives each comprise a positive drive belt and at least one driven pulley for driving the belt.

* * * * *